US012687460B2

(12) United States Patent
Lu et al.

(10) Patent No.: US 12,687,460 B2
(45) Date of Patent: Jul. 21, 2026

(54) SYSTEM AND METHOD FOR DETECTING A MECHANICAL TRANSMISSION FAILURE

(71) Applicant: PRATT & WHITNEY CANADA CORP., Longueuil (CA)

(72) Inventors: Xuening Lu, Oakville (CA); Ezzat Meshkinfam, Mississauga (CA); Etienne Plamondon, Candiac (CA); Thomas Trevor Ricci, Pointe-Claire (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 33 days.

(21) Appl. No.: 18/423,715

(22) Filed: Jan. 26, 2024

(65) Prior Publication Data

US 2025/0244203 A1     Jul. 31, 2025

(51) Int. Cl.
G01M 13/022          (2019.01)
F01D 21/00          (2006.01)
F02C 7/36          (2006.01)

(52) U.S. Cl.
CPC ......... G01M 13/022 (2013.01); F01D 21/003 (2013.01); F02C 7/36 (2013.01); *F05D 2260/406* (2013.01); *F05D 2260/83* (2013.01)

(58) Field of Classification Search
CPC ...... F01D 21/003; F01D 21/04; F01D 21/045; F01D 21/18; F02C 7/36; F05D 2260/406; F05D 2260/83; G01M 13/022
See application file for complete search history.

(56) References Cited

U.S. PATENT DOCUMENTS

| | | | | | |
|---|---|---|---|---|---|
| 3,988,893 | A | * | 11/1976 | Bojas | F16H 61/46 |
| | | | | | 60/435 |
| 5,713,204 | A | * | 2/1998 | Kadlicko | F02B 37/14 |
| | | | | | 60/605.1 |
| 10,669,949 | B2 | | 6/2020 | Boniface | |
| 10,975,717 | B2 | | 4/2021 | Moniz et al. | |
| 11,274,746 | B1 | * | 3/2022 | Karst | F16H 61/44 |
| 11,333,035 | B2 | * | 5/2022 | Ahmad | G08B 21/182 |
| 2010/0193631 | A1 | | 8/2010 | Laude | |

(Continued)

FOREIGN PATENT DOCUMENTS

DE          102020213596 A1     5/2022

OTHER PUBLICATIONS

European Patent Office, Communication re. extended European search report for European patent application No. 25154270.0, May 19, 2025.

(Continued)

*Primary Examiner* — Gerald L Sung
*Assistant Examiner* — Henry Ng
(74) *Attorney, Agent, or Firm* — Norton Rose Fulbright Canada LLP

(57)          ABSTRACT
Methods and systems for detecting a torque transmission failure in an aircraft power plant are provided. The system comprises a hydrostatic transmission for transmitting torque between a first shaft and a second shaft using hydraulic fluid, an failure detector including a sensor configured to detect a pressure change in the hydraulic fluid. The failure detector is configured to generate an output indicative of the torque transmission failure in response to the pressure change having crossed a threshold.

17 Claims, 9 Drawing Sheets

(56)    References Cited

U.S. PATENT DOCUMENTS

| | | | |
|---|---|---|---|
| 2013/0168179 A1* | 7/2013 | Will | F16H 61/431 |
| | | | 180/338 |
| 2016/0123223 A1* | 5/2016 | Brown | F04D 25/06 |
| | | | 415/122.1 |
| 2020/0018043 A1 | 1/2020 | Udagawa | |
| 2020/0096062 A1* | 3/2020 | Smith | F16D 48/02 |
| 2021/0071567 A1* | 3/2021 | Lemmers, Jr. | F16H 61/42 |
| 2021/0140432 A1* | 5/2021 | Reuter | G01N 9/32 |
| 2021/0301679 A1* | 9/2021 | Calderon | F01D 21/045 |
| 2023/0010174 A1* | 1/2023 | McCarthy | F01D 21/06 |
| 2023/0383697 A1* | 11/2023 | Cartwright | F02C 7/36 |
| 2024/0209772 A1* | 6/2024 | Favaretto | F02B 37/12 |

OTHER PUBLICATIONS

European Patent Office, Communication re. extended European search report for European patent application No. 25154270.0, May 5, 2025.

* cited by examiner

*1000*

*1002*

Transmitting torque between a first shaft and a second shaft via a hydrostatic transmission operating with hydraulic fluid at an expected pressure.

*1004*

Detecting a mechanical transmission failure by detecting a pressure change in the hydraulic fluid from the expected pressure.

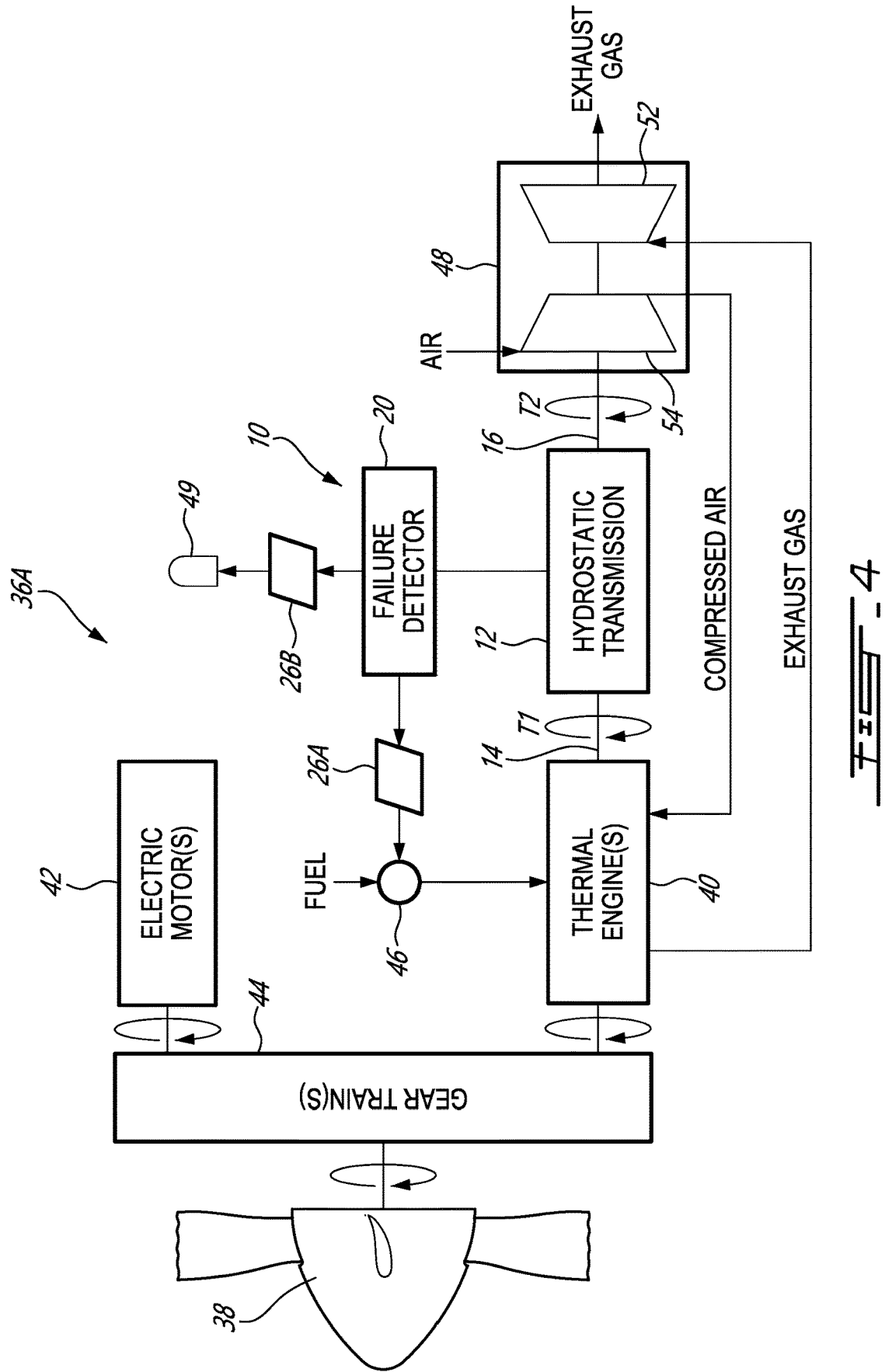
_FIG-4_

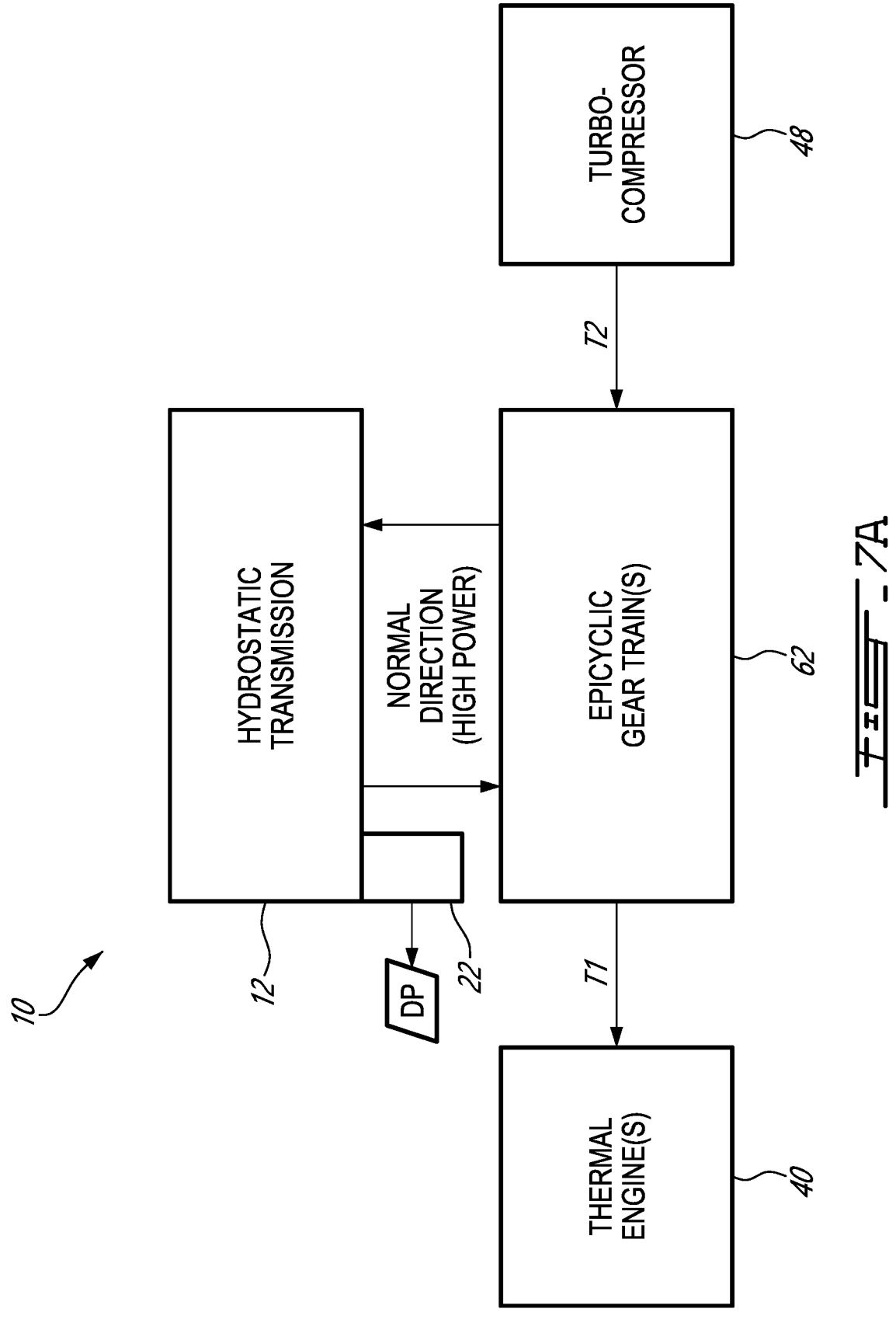
_FIG_.7A

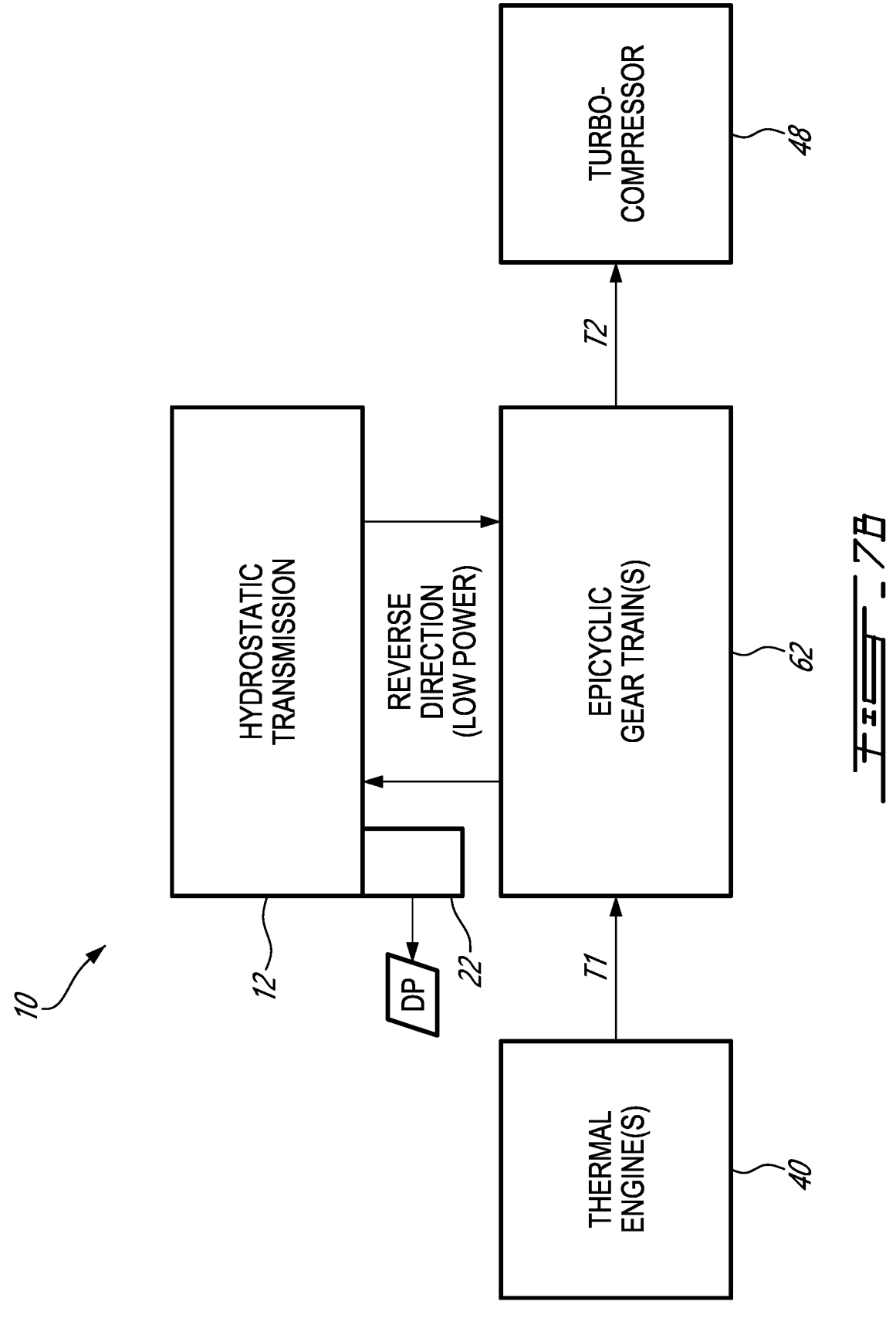

SYSTEM AND METHOD FOR DETECTING A MECHANICAL TRANSMISSION FAILURE

TECHNICAL FIELD

The disclosure relates generally to the detection of mechanical transmission failures, and more particularly to the detection of mechanical transmission failures in aircraft power plants.

BACKGROUND

Shaft shear is where a shaft is sheared/disconnected from the adjacent system components caused by shaft material failure due to excessive torsional shear stress. During operation of an aircraft engine, a shaft may experience relatively high torsional loads. In the unlikely event of a shaft shear and loss of load, a mitigating action must be initiated quickly to prevent further damage. However, quickly detecting the shaft shear event while avoiding erroneous (i.e., "false") alarming is challenging.

Improvement is desired.

SUMMARY

In one aspect, the disclosure describes a method of detecting a mechanical transmission failure. The method comprises:

transmitting torque between a first shaft and a second shaft via a hydrostatic transmission operating with a hydraulic fluid at an expected pressure; and when the torque is being transmitted between the first shaft and the second shaft, detecting the mechanical transmission failure by detecting a pressure change in the hydraulic fluid from the expected pressure.

The method may comprise: delivering the hydraulic fluid from a pump of the hydrostatic transmission to a motor of the hydrostatic transmission at a first pressure; and returning the hydraulic fluid from the motor of the hydrostatic transmission to the pump of the hydrostatic transmission at a second pressure.

The expected pressure may include an expected value of a difference between the first pressure and the second pressure. The pressure change may include a deviation from the expected value of the difference between the first pressure and the second pressure.

The mechanical transmission failure may be a shaft shear.

The method may comprise measuring the difference in pressure between the first pressure and the second pressure using a delta pressure sensor.

The method may comprise initiating a mitigating action in response to detecting the mechanical transmission failure.

The method may comprise: driving the first shaft with a thermal engine; transmitting the torque from the first shaft to the second shaft via the hydrostatic transmission; driving a compressor with the second shaft; and supplying compressed air from the compressor to the thermal engine.

The method may comprise: driving a turbine using exhaust gas from a thermal engine drivingly connected to the first shaft; driving the second shaft with the turbine; and transmitting the torque from the second shaft to the first shaft via the hydrostatic transmission.

The turbine may be part of a turbo-compressor. The method may include: driving a compressor of the turbo-compressor with the turbine; and supplying compressed air from the compressor to the thermal engine.

The first shaft may drivingly connect a thermal engine to the hydrostatic transmission. The second shaft may drivingly connect a turbine to the hydrostatic transmission. The method may include driving the turbine with exhaust gas from the thermal engine.

The method may comprise: driving a compressor with the turbine; and supplying compressed air to the thermal engine using the compressor.

The method may comprise stopping a fuel flow to the thermal engine in response to detecting the mechanical transmission failure.

Embodiments may include combinations of the above features.

In another aspect, the disclosure describes a mechanical transmission system with failure detection. The system comprises: a hydrostatic transmission configured to transmit torque between a first shaft and a second shaft using hydraulic fluid; and a failure detector including a sensor configured to detect a pressure change in the hydraulic fluid, the failure detector being configured to generate an output indicative of a torque transmission failure in response to the pressure change having crossed a threshold.

The hydrostatic transmission may include: a first conduit conveying the hydraulic fluid from a pump of the hydrostatic transmission to a motor of the hydrostatic transmission during operation of the hydrostatic transmission; and a second conduit conveying the hydraulic fluid from the motor to the pump during operation of the hydrostatic transmission. The pressure change may include a change in a difference in pressure of the hydraulic fluid in the first conduit and the hydraulic fluid in the second conduit.

The sensor may be a delta pressure sensor operatively connected to the first conduit and to the second conduit.

Embodiments may include combinations of the above features.

In a further aspect, the disclosure describes an aircraft power plant with shaft shear mitigation. The aircraft power plant comprises:

a thermal engine drivingly connectable to an air mover configured to propel an aircraft;

a hydrostatic transmission for transmitting torque between the thermal engine and a shaft using hydraulic fluid;

a sensor for detecting a pressure of the hydraulic fluid; and a computer operatively connected to the sensor and configured to initiate a mitigating action when the pressure of the hydraulic fluid is indicative of a shaft shear event causing a load change on the hydrostatic transmission.

The hydrostatic transmission may include: a first conduit conveying the hydraulic fluid from a pump of the hydrostatic transmission to a motor of the hydrostatic transmission during operation of the hydrostatic transmission; and a second conduit conveying the hydraulic fluid from the motor to the pump during operation of the hydrostatic transmission. The pressure of the hydraulic fluid may be indicative of a shaft shear event when a change in a difference in pressure of the hydraulic fluid in the first conduit and the hydraulic fluid in the second conduit has crossed a threshold.

The shaft may be drivingly connected to a turbo-compressor. A turbine of the turbo-compressor may be configured to be driven using exhaust gas from the thermal engine. A compressor of the turbo-compressor may be configured to be driven by the turbine. The compressor may be configured to supply compressed air for combustion in the thermal engine.

The aircraft power plant may comprise a speed-changing gear train operatively connected between the thermal engine and the turbo-compressor.

The aircraft power plant may be a hybrid aircraft power plant including an electric motor drivingly connectable to the air mover.

The mitigating action may include stopping a fuel delivery to the thermal engine.

Embodiments may include combinations of the above features.

Further details of these and other aspects of the subject matter of this application will be apparent from the detailed description included below and the drawings.

DESCRIPTION OF THE DRAWINGS

Reference is now made to the accompanying drawings, in which:

FIG. 4 is a schematic representation of an exemplary aircraft power plant including the mechanical transmission system of FIG. 1;

FIGS. 7A and 7B show a schematic representation of part of the aircraft power plant of FIG. 6 in different modes of operation.

DETAILED DESCRIPTION

The present disclosure describes mechanical transmission systems, aircraft power plants including such systems, failure detectors and associated methods of detecting mechanical transmission failures. In some embodiments, the methods and systems described herein may facilitate a relatively early detection of a mechanical transmission failure so that a mitigation action may be rapidly initiated in response to the failure detections. In some embodiments, the methods and systems described herein may facilitate the detection of an unlikely shaft shear event caused by a high torsional load for example. In some embodiments, the methods and systems described herein may reduce the likelihood of a false detection of the mechanical transmission failure. In some embodiments, the systems and methods described herein may make use of a hydrostatic transmission transmitting torque between two shafts where a change in pressure of the hydraulic fluid inside of the hydrostatic transmission may be used to detect the mechanical transmission failure.

Due to the relatively complex architecture and complex system dynamics of hybrid electric aircraft power plants including a thermal engine and an electric power train for propelling the aircraft, correctly detecting a shaft shear event and avoiding erroneous (i.e., false) alarming can be challenging. The systems and methods described herein may also facilitate the detection of a mechanical transmission failure such as a shaft shear event in hybrid aircraft power plants.

The term "connected" may include both direct connection (in which two elements that are connected to each other contact each other) and indirect connection (in which at least one additional element is located between the two elements). The term "substantially" as used herein may be applied to modify any quantitative representation which could permissibly vary without resulting in a change in the basic function to which it is related. As used herein, the singular forms "a," "an," and "the" are intended to include the plural forms as well, unless the context clearly indicates otherwise.

Aspects of various embodiments are described through reference to the drawings.

Figure 1:
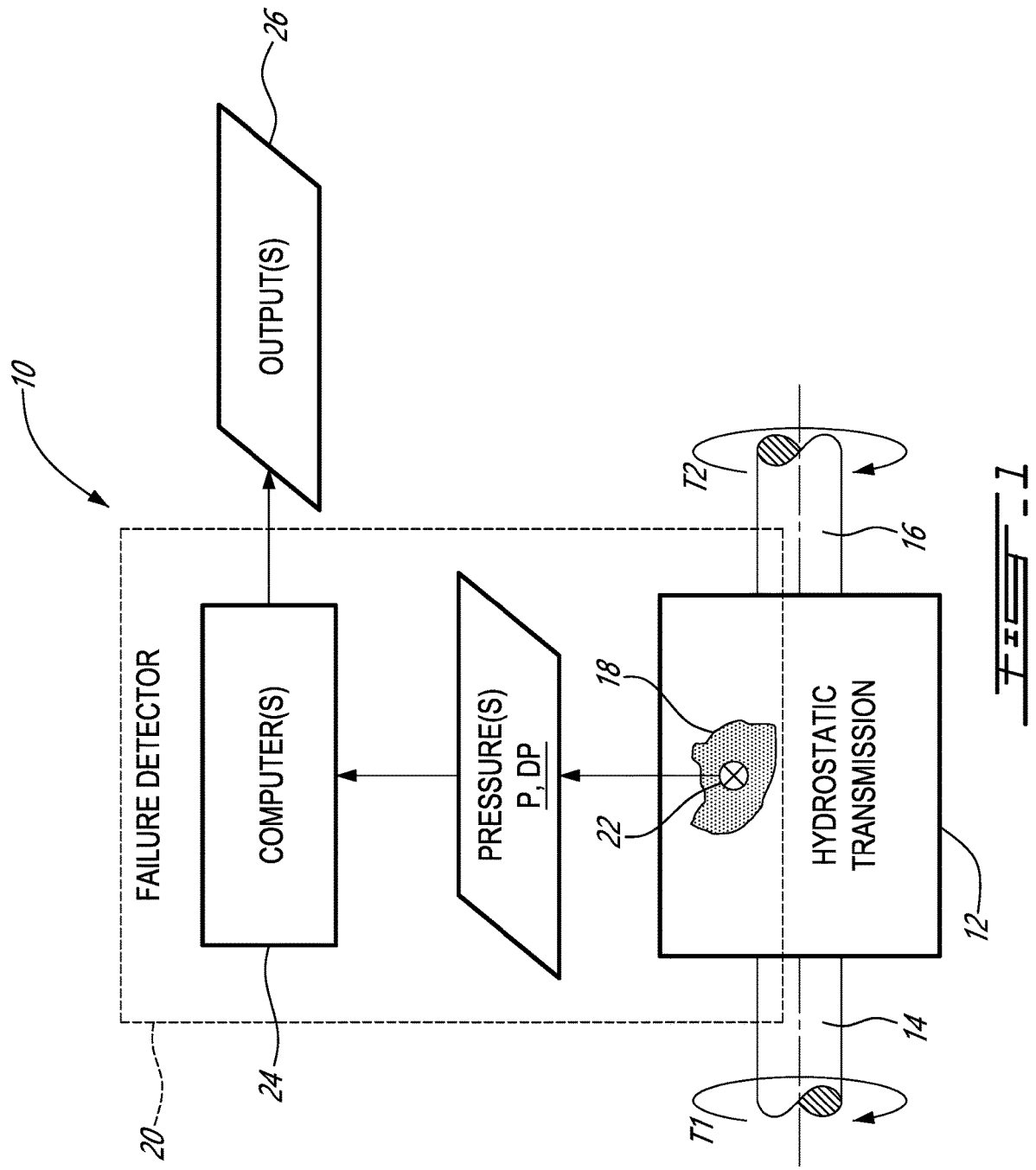
FIG. 1 shows a schematic representation of an exemplary mechanical transmission system with an exemplary failure detector.

FIG. 1 shows a schematic representation of an exemplary mechanical transmission system (referred hereinafter as "system 10") with failure detection capability. As explained below, system 10 may be used in an aircraft power plant used to propel an aircraft, or in an aircraft power plant such as an auxiliary power unit (APU) used for functions (e.g., generation of compressed air and/or electricity) other than propulsion of the aircraft. Alternatively, system 10 may be used for ground-based applications. System 10 may include hydrostatic transmission 12 configured to transmit energy between first shaft 14 and second shaft 16 using hydraulic fluid 18 (i.e., hydraulic liquid or oil). Hydrostatic transmission 12 may be operable in one mode of operation where torque T1 from first shaft 14 is transmitted to second shaft 16. In some embodiments, hydrostatic transmission 12 may be bidirectional so that the operation of hydrostatic transmission 12 may be reversible. For example, hydrostatic transmission 12 may be operable in another mode of operation where torque T2 from second shaft 16 is transmitted to first shaft 14.

System 10 may include failure detector 20 that is configured to detect a mechanical (e.g., torque) transmission failure. Failure detector 20 may be configured to detect a shaft shear event on an input side or on an output side of hydrostatic transmission 12. A shaft shear event (e.g., break of first shaft 14) on an input side of hydrostatic transmission 12 may cause an input torque (e.g., first torque T1) to suddenly become disconnected from hydrostatic transmission 12. A shaft shear event (e.g., break of second shaft 16) on the output side of hydrostatic transmission 12 may cause a mechanical load (e.g., second torque T2) drivingly connected to hydrostatic transmission 12 to suddenly become disconnected from hydrostatic transmission 12.

In some embodiments, failure detector 20 may be used to detect other types of mechanical transmission failures such as a shaft lock due to a gear train failure (e.g., seizure) or a bearing failure (e.g., seizure) for example. A shaft lock event (e.g., locking of first shaft 14) on an input side of hydrostatic transmission 12 may cause an input torque (e.g., first torque T1) to suddenly become disconnected from hydrostatic transmission 12. A shaft lock event (e.g., locking of second shaft 16) on the output side of hydrostatic transmission 12 may cause a mechanical load (e.g., second torque T2) drivingly connected to hydrostatic transmission 12 to suddenly increase.

Failure detector 20 may include one or more pressure sensors 22 configured to detect a change in pressure P, DP in hydraulic fluid 18. In various embodiments, pressure sensor(s) 22 (referred hereinafter in the singular) may be of known or other suitable type(s). In some embodiments, a single pressure sensor 22 may detect/measure a (e.g., absolute or relative) pressure P of hydraulic fluid 18 at a single location within hydrostatic transmission 12. As explained further below, pressure sensor 22 may, in some embodiments, include a delta pressure sensor, also called a differential pressure sensor configured to measure a pressure differential (referred hereinafter as "delta pressure DP") between two locations that may potentially exhibit different fluid pressures. Alternatively, individual sensors may separately measure respective pressures P at different locations and delta pressure DP may be computed. As explained further below an unexpected value of pressure P and/or delta pressure DP may be indicative of a mechanical transmission failure associated with hydrostatic transmission 12 and/or a system drivingly connected thereto.

In some embodiments, failure detector 20 may include one or more computers 24 (referred hereinafter in the singular) operatively connected to pressure sensor 22 so that one or more signals indicative or pressure P and/or delta pressure DP may be received at computer 24. Value(s) of pressure P and/or delta pressure DP may be used by computer 24 to detect the occurrence (e.g., onset) of the mechanical transmission failure (e.g., shaft shear event). After (e.g., in response to) detecting such mechanical transmission failure based on pressure P and/or delta pressure DP, computer 24 may generate one or more outputs 26 (referred hereinafter in the singular). Output 26 may include signal(s) causing the initiation of one or more actions for mitigating the mechanical transmission failure.

Figure 2:
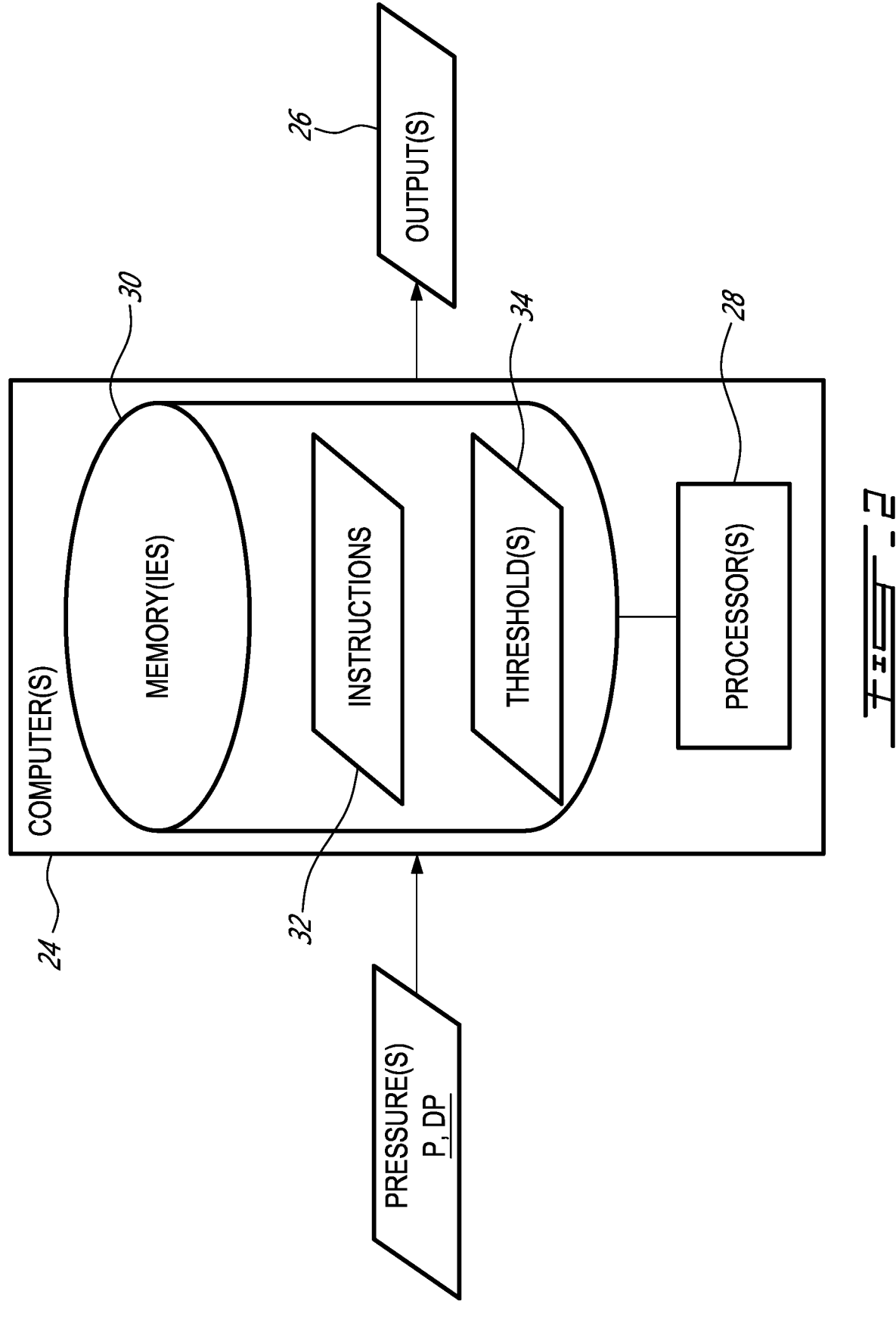
FIG. 2 is a flow diagram of an exemplary method of detecting a mechanical transmission failure.

FIG. 2 is a schematic representation of an exemplary computer 24 of failure detector 20 of FIG. 1. Computer 24 may include one or more data processors 28 (referred hereinafter in the singular) and non-transitory machine-readable memory(ies) 30 (referred hereinafter in the singular). Computer 24 may be configured to detect the mechanical transmission failure based on pressure P and/or delta pressure DP, generate output(s) 26 and optionally also perform other tasks. In some embodiments, computer 24 may be dedicated only to failure detector 20 to promote prompt computation and expediency in detecting the mechanical transmission failure. For example, computer 24 may only perform functions associated with failure detector 20. For example, computer 24 may be separate from a controller (e.g., electronic engine controller (EEC)) used to control one or more other aspects of a larger system such as thermal engine 40 or an aircraft power plant incorporating system 10 for example. In other words, the computations performed to detect the mechanical transmission failure may operate independently of any computations performed by the EEC to promote a prompt detection of the mechanical transmission failure. Alternatively, computer 24 may include or be part of a controller such as an EEC and may perform additional functions not necessarily associated with failure detector 20. Computer 24 may receive input(s) such as signal(s) from indicative of pressure P and/or delta pressure DP from pressure sensor 22, perform one or more procedures or steps defined by instructions 32 (e.g., software) stored in memory 30 and executable by processor(s) 28 to generate one or more outputs 26 including signal(s) configured to initiate one or more mitigating actions.

Processor(s) 28 may include any suitable device(s) configured to cause a series of steps to be performed by computer 24 so as to implement a controller-implemented process such that instructions 32, when executed by computer 24 or other programmable apparatus, may cause the functions/acts specified in the methods described herein to be executed. Processor(s) 28 may include, for example, any type of general-purpose microprocessor or microcontroller, a digital signal processing (DSP) processor, an integrated circuit, a field programmable gate array (FPGA), a reconfigurable processor, other suitably programmed or programmable logic circuits, or any combination thereof.

Memory 30 may include any suitable machine-readable storage medium. Memory 30 may include non-transitory controller readable storage medium such as, for example, but not limited to, an electronic, magnetic, optical, electro-magnetic, infrared, or semiconductor system, apparatus, or device, or any suitable combination of the foregoing. Memory 30 may include any storage means (e.g., devices) suitable for retrievably storing machine-readable instructions 32 executable by processor(s).

One or more thresholds 34 may also be stored in memory 30 or otherwise be available to computer 24 for detecting the mechanical transmission failure. Threshold(s) 34 may have the form of a look-up table with pressure change thresholds applicable to one or more operating conditions of system 10 and/or of hydrostatic transmission 12. In some embodiments, values of pressure P and/or delta pressure DP may be received at computer 24 substantially continuously so that computer 24 may continuously monitor pressure P and/or delta pressure DP substantially in real-time during operation of hydrostatic transmission 12. Computer 24 may monitor changes in pressure P and/or delta pressure DP and compare such change(s) with applicable threshold(s) 34 to determine if pressure P and/or delta pressure DP is/are indicative of a non-normal condition such as the mechanical transmission failure for example.

Figure 3:
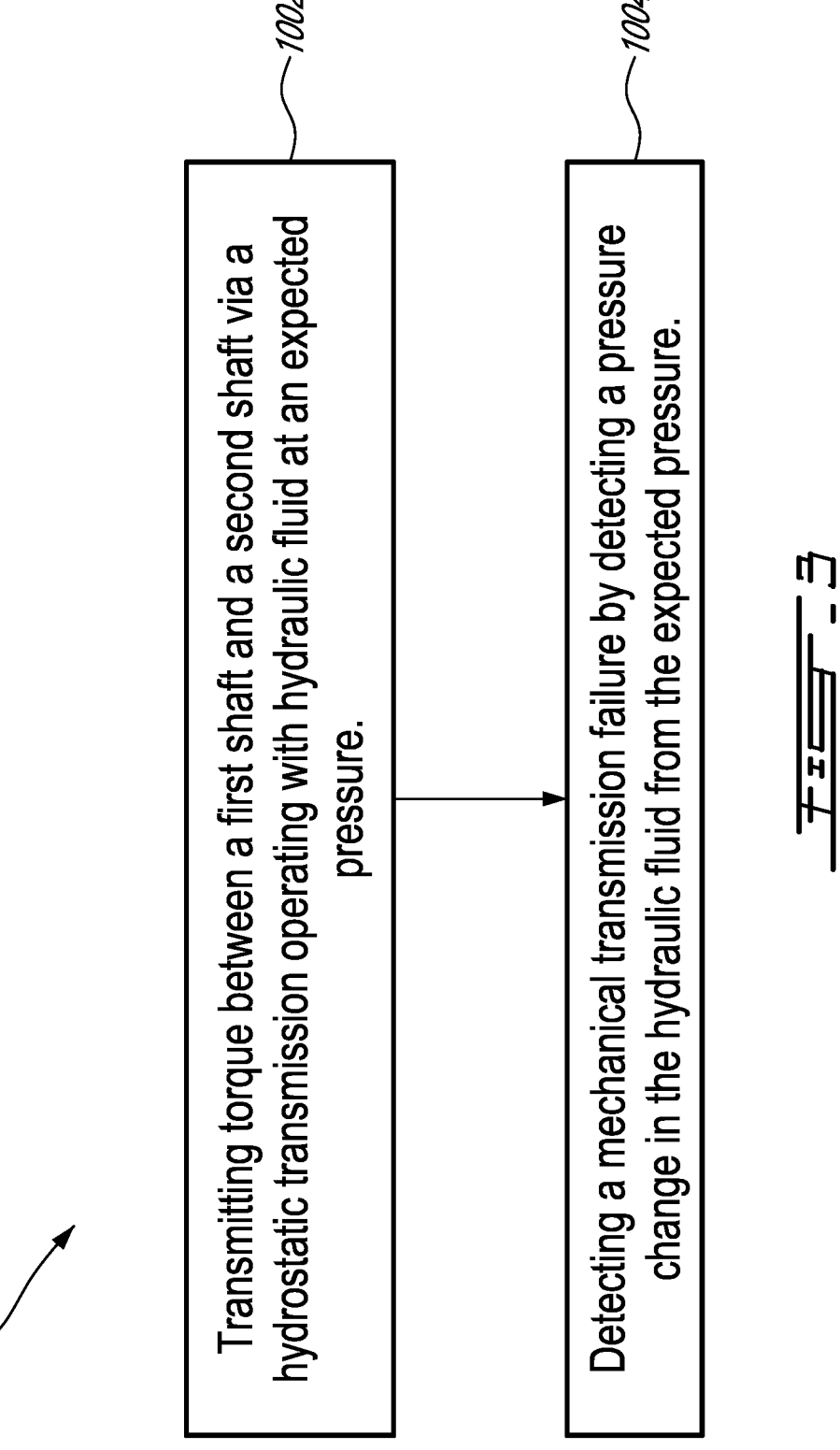
FIG. 3 is a schematic representation of an exemplary computer of the failure detector of FIG. 1.

FIG. 3 is a flow diagram of an exemplary method 1000 of detecting a mechanical transmission failure. Method 1000 may be performed using system 10 or using another mechanical transmission system(s). For example, machine-readable instructions 32 may be configured to cause computer 24 to detect the mechanical transmission failure. Method 1000 may include aspects of system 10 and of aircraft power plants 36A, 36B (shown in FIGS. 4 and 6) described herein. In various embodiments, method 100 includes:

transmitting torque between first shaft 14 and second shaft 16 via hydrostatic transmission 12 operating with hydraulic fluid 18 at an expected pressure P and/or delta pressure DP (block 1002); and when the torque is being transmitted between first shaft 14 and second shaft 16, detecting the mechanical transmission failure by detecting a pressure change in hydraulic fluid from the expected pressure P and/or delta pressure DP (block 1004).

Further aspects of method 1000 are described below in reference to the subsequent figures.

FIG. 4 is a schematic representation of an exemplary aircraft power plant 36A (referred hereinafter as "power plant 36A") including system 10. In some embodiments, power plant 36A may be a hybrid aircraft power plant. Power plant 36A may include shaft shear detection and optional mitigation capabilities via failure detector 20. Power plant 36A may be drivingly connectable to one or more air movers 38 (referred hereinafter in the singular) such as a variable-pitch propeller, fan and/or other bladed rotors configured to propel an aircraft by generating thrust for example. Power plant 36A may be used to propel a fixed wing aircraft or a rotary wing aircraft such as a helicopter where power plant 36A is operatively connected to drive a main rotor and/or a tail rotor of the helicopter.

Power plant 36A may include one or more thermal engines 40 (referred hereinafter in the singular) and optionally one or more electric motors 42 (referred hereinafter in the singular as "motor 42"). In various embodiments of power plant 36A, thermal engine 40 and motor 42 may be arranged in parallel or in series. In some embodiments, one or both of thermal engine 40 and motor 42 may be drivingly connected to (i.e., in torque-transmitting engagement with) air mover 38 via one or more gear trains 44 (referred hereinafter in the singular). In some embodiments, gear train 44 may include a combining gear train receiving respective input torques from thermal engine 40 and from motor 42 and delivering a combined output torque to air mover 38. In some embodiments, gear train 44 may include a speed-reducing gear train, sometimes referred to as a reduction gearbox (RGB), so that the rotation speed of air mover 38 may be lower than an operating speed of thermal engine 40 and/or an operating speed of motor 42.

Thermal engine 40 may include a (e.g., continuous or intermittent) internal combustion engine. In various embodiments, thermal engine 40 may include a gas turbine engine, a rotary (e.g., Wankel) engine or a piston engine for example. Thermal engine 40 may operate from the combustion of a suitable (e.g., liquid) fuel supplied to thermal engine 40 via fuel metering valve 46, which may be part of a fuel metering unit.

In various embodiments, motor 42 may be a permanent magnet synchronous motor, a brushless direct-current (DC) electric motor, or an alternating-current (AC) motor for example. Motor 42 may be driven using electric energy received from a suitable electric energy source such as a battery for example.

In various embodiments, thermal engine 40 and motor 42 may be controlled by one or more controllers. Thermal engine 40 and motor 42 may be operated either together or separately to drive air mover 38. In some embodiments, the operation of thermal engine 40 and/or motor 42 may be selected based on a phase of flight of the aircraft and/or based on an action (e.g., maneuver) to be executed by the aircraft.

In some embodiments, thermal engine 40 may be operated with the assistance of turbo-compressor 48. Turbo-compressor 48 may be drivingly connected to (i.e., in torque-transmitting engagement with) thermal engine 40 via first shaft 14, hydrostatic transmission 12 and second shaft 16. In other words, hydrostatic transmission 12 may transmit torque between thermal engine 40 and turbo-compressor 48. Turbo-compressor 48 may include compressor 54 receiving ambient air and compressing the ambient air. The compressed air generated by compressor 54 may be delivered to thermal engine 40 for mixing with the fuel and combustion inside a combustion chamber of thermal engine 40. Turbo-compressor 48 may also include turbine 56, which may be driven with a flow of exhaust gas received from thermal engine 40 before discharging the exhaust gas to the environment. Compressor 54 and turbine 56 may be drivingly connected together by a shaft so that the rotation of turbine 56 may drive the rotation of compressor 54 for example. Compressor 54 and turbine 56 may also be drivingly connected to hydrostatic transmission 12 via second shaft 16.

In a normal (e.g., high-power) mode of operation, turbo-compressor 48 may provide additional motive power to thermal engine 40. For example, as the exhaust gas from thermal engine 40 drives turbine 56 and turbine 56 drives compressor 54, the remaining (i.e., additional) motive power available in turbo-compressor 48 may be transmitted to thermal engine 40 via second shaft 16, hydrostatic transmission 12 and first shaft 14.

In a reverse (e.g., low-power) mode of operation, the operation of hydrostatic transmission 12 may be reversed so that thermal engine 40 may supply motive power to turbo-compressor 48. For example, motive power from thermal engine 40 may be transmitted to turbo-compressor 48 via first shaft 14, hydrostatic transmission 12 and second shaft

16. In the second mode of operation, turbine 56 may continue to be driven by the exhaust gas from thermal engine 40 and compressor 54 may continue to supply compressed air for combustion into thermal engine 40.

Failure detector 20 may be operatively connected to hydrostatic transmission 12 as explained above. Through the sensing of one or more hydraulic pressures inside of hydrostatic transmission, failure detector 20 may detect a mechanical transmission failure such as a shaft shear event in a driveline associated with thermal engine 40 or in a driveline associated with turbo-compressor 48. The mechanical transmission failure may cause an unexpected change in pressure P and/or in delta pressure DP (e.g., crossing a threshold 34) of hydraulic fluid 18 inside of hydrostatic transmission 12. Threshold(s) 34 may be determined empirically or through simulation/modeling. Threshold(s) 34 may include pressure values or changes in pressures that would typically not be exceeded during normal operation of power plant 36A. In other words, threshold(s) 34 may be selected so that crossing of threshold(s) 34 would be unexpected during normal operation and would therefore be indicative of a non-normal condition. As used herein, exceeding threshold(s) 34 for the purpose of detecting the mechanical transmission failure may include overshooting one or more high threshold values or undershooting one or more low threshold values.

Failure detector 20 may also be configured to initiate one or more mitigating actions when pressure P and/or in delta pressure DP of the hydraulic fluid is indicative of a mechanical transmission failure such as a shaft shear event causing a load change on hydrostatic transmission 12. Initiating the mitigating action(s) may be achieved by way of one or more output(s) 26A, 26B (i.e., signals) that cause the mitigating action(s) to be initiated. Examples of mitigating actions may include stopping a fuel flow to thermal engine 40 and/or alerting the flight crew of the aircraft being propelled by power plant 36A. For example, output 26A may be a signal causing the closing of fuel metering valve 46. Output 26B may be a signal causing indication 49 to be presented to the flight crew to alert the flight crew of the mechanical transmission failure. In various embodiments, indication 49 may include a visual and/or an aural indication.

Figure 5A:
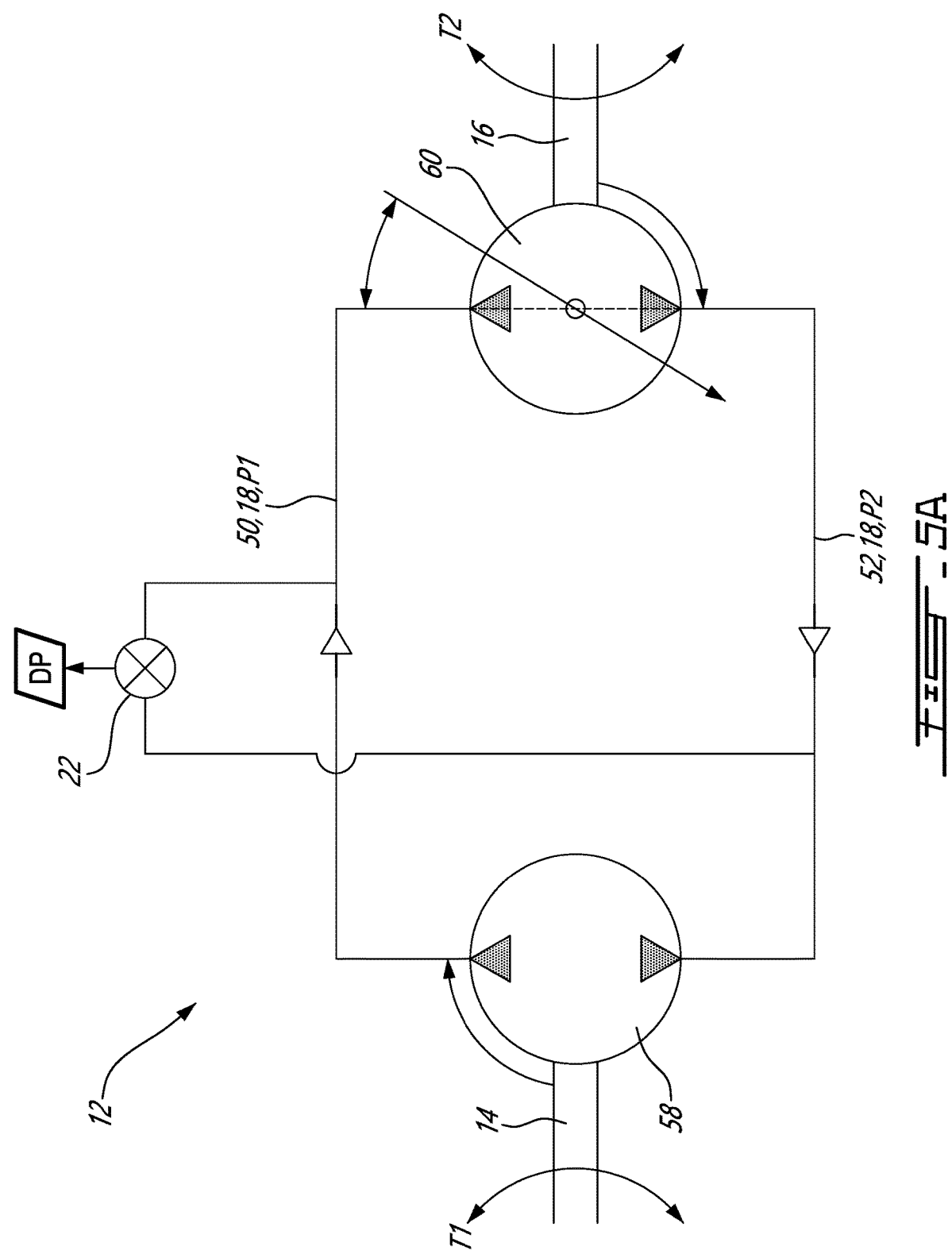
FIGS. 5A and 5B show schematic representations of an exemplary hydrostatic transmission in different modes of operation.
Figure 5B:
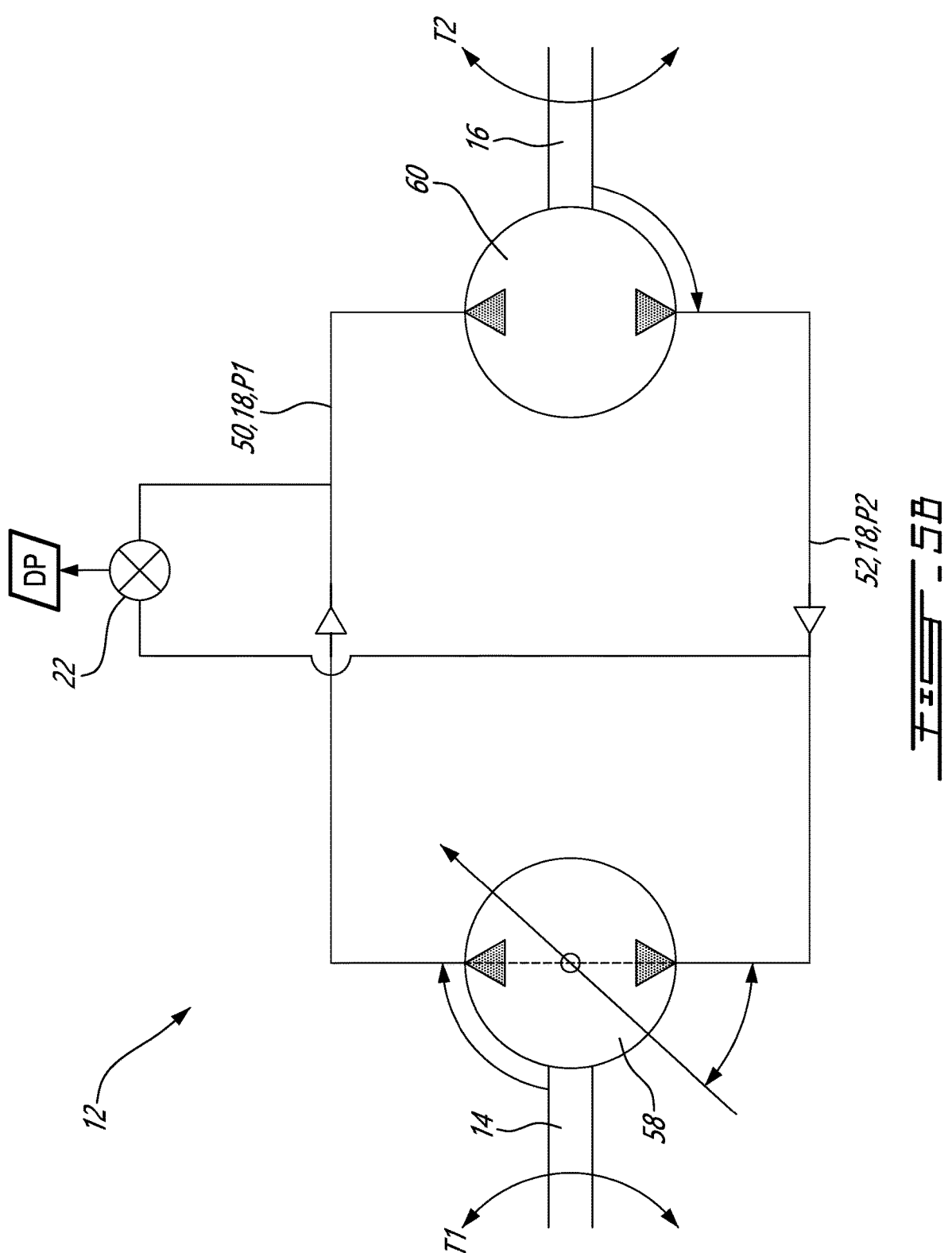

FIGS. 5A and 5B show a schematic representation of an exemplary hydrostatic transmission 12 in different modes of operation. Hydrostatic transmission 12 may transmits energy using hydraulic fluid 18. Hydrostatic transmission 12 may have two hydraulic devices where one works as a variable displacement pump and the other works as a motor fluidly and are hydraulically connected together by first hydraulic conduit 50 and second hydraulic conduit 52 defining part of a hydraulic circuit. The hydraulic device operating as a pump converts mechanical energy into pressure and the other hydraulic device operating as a motor reconverts the pressure energy to mechanical energy. By varying the displacement of the pump, a continuous ratio from a minimum (e.g., zero) value to a maximum value can be obtained to define a variable speed transmission. The energy transmission direction (i.e., direction of torque transfer) may be reversed by the pump acting as the motor and the motor acting as the pump. Since the exemplary hydrostatic transmission 12 shown in FIGS. 5A and 5B may be bidirectional (reversible), the two hydraulic devices are referenced herein as first pump/motor 58 and second pump/motor 60.

In the normal mode of operation shown in FIG. 5A, second pump/motor 60 may operate as the hydraulic pump and first pump/motor 58 may operate as the hydraulic motor. Second pump/motor 60 may be driven by second shaft 16. Second pump/motor 60 may pressurize hydraulic fluid 18 to second pressure P2. The pressurized hydraulic fluid 18 may be conveyed (e.g., delivered) from second pump/motor 60 to first pump/motor 58 via second conduit 52. The pressurized hydraulic fluid 18 may drive first pump/motor 58, which may in turn drive first shaft 14. Hydraulic fluid 18 at first pressure P1 lower than second pressure P2 (i.e., P2>P1) may be conveyed (e.g., returned) from first pump/motor 58 to second pump/motor 60 via first conduit 50. The variable displacement of second pump/motor 60 may be achieved using an adjustable swash plate.

In the embodiment shown in FIGS. 5A and 5B, pressure sensor 22 may be a suitable delta pressure sensor providing a signal indicative of delta pressure DP indicative of a difference in pressure between first pressure P1 and second pressure P2. Pressure sensor 22 may include a first port in fluid communication with first conduit 50 to sense first pressure P1, and a second port in fluid communication with second conduit 52 to sense second pressure P2. A change in delta pressure DP (e.g., P1-P2) crossing threshold(s) 34 may be indicative of the mechanical transmission failure causing an unexpected (e.g., sudden) load change on hydrostatic transmission 12 and detectable by way of delta pressure DP. For example, a shaft shear event may result in an unexpected decrease in delta pressure DP.

In the reverse mode of operation shown in FIG. 5B, first pump/motor 58 may operate as the hydraulic pump and second pump/motor 60 may operate as the hydraulic motor. First pump/motor 58 may be driven by first shaft 14. First pump/motor 58 may pressurize hydraulic fluid 18 to first pressure P1. The pressurized hydraulic fluid 18 may be conveyed (e.g., delivered) from first pump/motor 58 to second pump/motor 60 via first conduit 50. The pressurized hydraulic fluid 18 may drive second pump/motor 60, which may in turn drive second shaft 16. The hydraulic fluid 18 at second pressure P2 lower than first pressure P1 (i.e., P1>P2) may be conveyed (e.g., returned) from second pump/motor 60 to first pump/motor 58 via second conduit 52. The variable displacement of first pump/motor 58 may be achieved using an adjustable swash plate. The variable displacement of first pump/motor 58 and/or second pump/motor 60 may provide variable speed transmission in one or both modes of operation of hydrostatic transmission 12.

Figure 6:
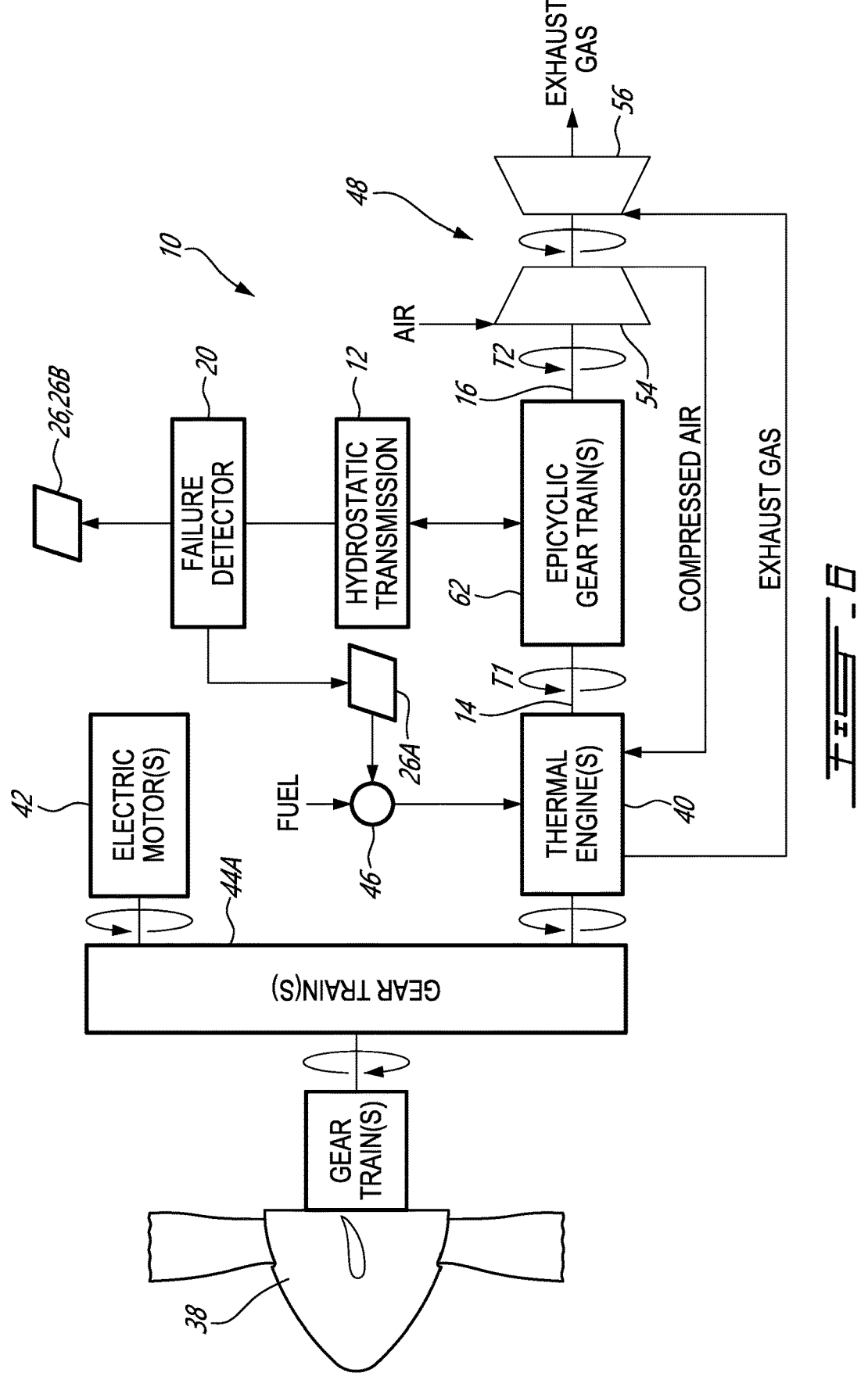
FIG. 6 is a schematic representation of another exemplary aircraft power plant including the mechanical transmission system of FIG. 1.

FIG. 6 is a schematic representation of another exemplary aircraft power plant 36B (referred hereinafter as "power plant 36B") including system 10. Power plant 36B includes elements of power plant 36A described above. Like elements are identified using like reference numerals. In some embodiments, power plant 36B may be a hybrid aircraft power plant. Power plant 36B may include shaft shear detection and optional mitigation capabilities via failure detector 20. Power plant 36B may be drivingly connectable to air mover 38. Power plant 36B may be used to propel a fixed wing aircraft or a rotary wing aircraft such as a helicopter.

In contrast with power plant 36A, power plant 36B may include a compound drive between thermal engine 40 and turbo-compressor 48. The compound drive may include a speed-changing gear train such as epicyclic gear train 62 and hydrostatic transmission 12 operatively connected between thermal engine 40 and turbo-compressor 48.

Power plant 36B may also include two gear trains 44A, 44B between air mover 38 and prime mover(s) such as thermal engine 40 and motor 42. First gear train 44A may include a combining gear train receiving respective input torques from thermal engine 40 and from motor 42 and delivering a combined output torque. Second gear train 44B may include a speed-reducing gear train operatively connected between air mover 38 and first gear train 44A.

FIGS. 7A and 7B show a schematic representation of part of power plant 36B in different modes of operation. The directions of energy transfer are indicated with arrows in FIGS. 7A and 7B. In some embodiments, hydrostatic transmission 12 may be drivingly connected to gears of epicyclic gear train 62 to define a compound drive. For example, first pump/motor 58 and second pump/motor 60 may be individually drivingly (e.g., mechanically) connected to separate gears of epicyclic gear train 62. Hydrostatic transmission 12 may be reversibly operable to provide speed regulations under different engine operating ranges for power optimization.

Due to the direct mechanical connections between thermal engine 40, first shaft 14 and epicyclic gear train 62, and also between turbo-compressor, second shaft 16 and epicyclic gear train 62, hydrostatic transmission 12 will see (i.e., be subjected to) sudden mechanical torque load changes from thermal engine 40 and/or from turbo-compressor 48 due to the mechanical connections between hydrostatic transmission 12 and epicyclic gear train 62. A mechanical torque load change seen by hydrostatic transmission 12 may be translated into a form of hydraulic torque within hydrostatic transmission 12. The hydraulic torque is proportional to delta pressure DP due to system dynamics between pump/motors 58, 60 and hydraulic conduits 50, 52 and can be theoretically estimated using the following equations:

$$\text{Pump Hydraulic Torque}=(\text{Pump Efficiency})\times(\text{Volumetric Displacement of Pump})\times(\text{DP})+(\text{Torque Loss}); \text{ and} \quad (1)$$

$$\text{Motor Hydraulic Torque}=(\text{Motor Efficiency})\times(\text{Volumetric Displacement of Motor})\times(\text{DP})+(\text{Torque Loss}). \quad (2)$$

The torque loss may account for viscous losses and coulomb friction torque losses. The pump efficiency, motor efficiency, volumetric displacements and torque losses may all be constants or based on performance maps that can be pre-programmed and stored in memory 30 of computer 24. The values of delta pressure DP may be acquired using delta pressure sensor 22 shown in FIGS. 5A and 5B. Therefore, delta pressure DP acquired from hydrostatic transmission 12 may be used to detect a potential shaft shear event. The shaft shear event can be detected if delta pressure DP exhibits an abnormal overshoot or undershoot of one or more prescribed threshold 34. The use of delta pressure DP may be used to detect the mechanical transmission failure in both the normal (i.e., high-power) and reverse (i.e., low-power) modes of operation of system 10 per equations 1 and 2 above. In some embodiments, proportional gains may be applied to delta pressure DP for the detection of the mechanical transmission failure depending on the operating condition and/or on the mode of operation of system 10.

FIG. 7A schematically illustrates the normal (i.e., high-power) mode of operation corresponding to the mode of operation of hydrostatic transmission 12 illustrated in FIG. 5A. In the normal mode of operation, energy is transferred from turbo-compressor 48 to thermal engine 40 via the compound drive defined by epicyclic gear train 62 and hydrostatic transmission 12. Specifically, torque T2 is transmitted from turbo-compressor 48 to epicyclic gear train 62, torque is transmitted from one gear of epicyclic gear train 62 to second pump/motor 60 of hydrostatic transmission 12, hydraulic torque is transmitted from second pump/motor 60 to first pump/motor 58 of hydrostatic transmission 12, torque is transmitted from first pump/motor 58 to another gear of epicyclic gear train 62, and torque T1 is transmitted from epicyclic gear train 62 to thermal engine 40.

FIG. 7B schematically illustrates the reverse (i.e., low-power) mode of operation corresponding to the mode of operation of hydrostatic transmission 12 illustrated in FIG. 5B. In the reverse mode of operation, energy is transferred from thermal engine 40 to turbo-compressor 48 via the compound drive defined by epicyclic gear train 62 and hydrostatic transmission 12. Specifically, torque T1 is transmitted from thermal engine 40 to epicyclic gear train 62, torque is transmitted from a gear of epicyclic gear train 62 to first pump/motor 58, hydraulic torque is transmitted from first pump/motor 58 to second pump/motor 60 of hydrostatic transmission 12, torque is transmitted from second pump/motor 60 to another gear of epicyclic gear train 62, and torque T2 is transmitted from epicyclic gear train 62 to turbo-compressor 48.

The embodiments described in this document provide non-limiting examples of possible implementations of the present technology. Upon review of the present disclosure, a person of ordinary skill in the art will recognize that changes may be made to the embodiments described herein without departing from the scope of the present technology.

What is claimed is:

1. A method of detecting a mechanical transmission failure in a driveline connected to a hydrostatic transmission, the method comprising:

transmitting torque between a first shaft of the driveline and a second shaft via the hydrostatic transmission operating with a hydraulic fluid at an expected pressure by:

delivering the hydraulic fluid from a pump of the hydrostatic transmission to a motor of the hydrostatic transmission at a first pressure via a first conduit; and returning the hydraulic fluid from the motor of the hydrostatic transmission to the pump of the hydrostatic transmission at a second pressure via a second conduit;

operating the hydrostatic transmission when the mechanical transmission failure occurs while the torque is being transmitted between the first shaft and the second shaft, the mechanical transmission failure causing a pressure change in the hydraulic fluid from the expected pressure;

measuring a difference between the first pressure and the second pressure with a delta pressure sensor operatively connected to the first conduit and to the second conduit; and detecting the pressure change in the hydraulic fluid from the expected pressure, wherein:

the expected pressure includes an expected value of the difference between the first pressure and the second pressure; and the pressure change includes a deviation from the expected value of the difference between the first pressure and the second pressure.

2. The method as defined in claim 1, wherein the mechanical transmission failure is a shaft shear in the driveline connected to the hydrostatic transmission.

3. The method as defined in claim 1, comprising initiating a mitigating action in response to detecting the pressure change in the hydraulic fluid from the expected pressure.

4. The method as defined in claim 1, comprising:

driving the first shaft with a thermal engine;

transmitting the torque from the first shaft to the second shaft via the hydrostatic transmission;

driving a compressor with the second shaft; and supplying compressed air from the compressor to the thermal engine.

5. The method as defined in claim 1, comprising:

driving a turbine using exhaust gas from a thermal engine drivingly connected to the first shaft;

driving the second shaft with the turbine; and transmitting the torque from the second shaft to the first shaft via the hydrostatic transmission.

6. The method as defined in claim 5, wherein:

the turbine is part of a turbo-compressor;

the method includes:

driving a compressor of the turbo-compressor with the turbine; and supplying compressed air from the compressor to the thermal engine.

7. The method as defined in claim 6, wherein:

the hydrostatic transmission is part of a compound drive operatively connecting the thermal engine and the turbo-compressor; and the compound drive includes a speed-changing epicyclic gear train.

8. The method as defined in claim 1, wherein:

the first shaft drivingly connects a thermal engine to the hydrostatic transmission;

the second shaft drivingly connects a turbine to the hydrostatic transmission; and the method includes driving the turbine with exhaust gas from the thermal engine.

9. The method as defined in claim 8, comprising:

driving a compressor with the turbine; and supplying compressed air to the thermal engine using the compressor.

10. The method as defined in claim 9, comprising stopping a fuel flow to the thermal engine in response to detecting the pressure change in the hydraulic fluid from the expected pressure.

11. The method as defined in claim 1, wherein the pressure change is detected using a computer that is dedicated only to detecting the mechanical transmission failure.

12. A mechanical transmission system with failure detection, the system comprising:

a hydrostatic transmission configured to transmit torque between a first shaft and a second shaft using hydraulic fluid; and a failure detector including a sensor configured to, when a torque transmission failure causes a pressure change in the hydraulic fluid, detect the pressure change in the hydraulic fluid, the failure detector being configured to generate an output indicative of the torque transmission failure in response to the pressure change having crossed a threshold, wherein:

the hydrostatic transmission includes:

a first conduit conveying the hydraulic fluid from a pump of the hydrostatic transmission to a motor of the hydrostatic transmission during operation of the hydrostatic transmission; and a second conduit conveying the hydraulic fluid from the motor to the pump during operation of the hydrostatic transmission;

the pressure change includes a change in a difference in pressure of the hydraulic fluid in the first conduit and the hydraulic fluid in the second conduit;

the sensor is a delta pressure sensor operatively connected to the first conduit and to the second conduit.

13. An aircraft power plant with shaft shear mitigation, the aircraft power plant comprising:

a thermal engine drivingly connectable to an air mover configured to propel an aircraft;

a hydrostatic transmission for transmitting torque between the thermal engine and a shaft using hydraulic fluid;

a sensor for detecting a pressure of the hydraulic fluid; and a computer operatively connected to the sensor and configured to initiate a mitigating action when a shaft shear event causes a load change on the hydrostatic transmission and the pressure of the hydraulic fluid detected by the sensor is indicative of the shaft shear event, wherein:

the hydrostatic transmission includes:

a first conduit conveying the hydraulic fluid from a pump of the hydrostatic transmission to a motor of the hydrostatic transmission during operation of the hydrostatic transmission; and a second conduit conveying the hydraulic fluid from the motor to the pump during operation of the hydrostatic transmission;

the pressure of the hydraulic fluid is indicative of the shaft shear event when a change in a difference in pressure of the hydraulic fluid in the first conduit and the hydraulic fluid in the second conduit has crossed a threshold; and the sensor is a delta pressure sensor operatively connected to the first conduit and to the second conduit.

14. The aircraft power plant as defined in claim 13, wherein:

the shaft is drivingly connected to a turbo-compressor;

a turbine of the turbo-compressor is configured to be driven using exhaust gas from the thermal engine;

a compressor of the turbo-compressor is configured to be driven by the turbine; and the compressor is configured to supply compressed air for combustion in the thermal engine.

15. The aircraft power plant as defined in claim 14, comprising a speed-changing gear train operatively connected between the thermal engine and the turbo-compressor.

16. The aircraft power plant as defined in claim 15, wherein the aircraft power plant is a hybrid aircraft power plant including an electric motor drivingly connectable to the air mover.

17. The aircraft power plant as defined in claim 16, wherein the mitigating action includes stopping a fuel delivery to the thermal engine.

* * * * *